United States Patent [19]
Augier

[11] Patent Number: 5,634,506
[45] Date of Patent: Jun. 3, 1997

[54] COMPOSITE WHEEL

[75] Inventor: Pierre J. Augier, Grosse Pointe, Mich.

[73] Assignee: Trinc, Tire & Rim, Inc., Grosse Pointe, Mich.

[21] Appl. No.: 565,095

[22] Filed: Nov. 30, 1995

Related U.S. Application Data

[63] Continuation-in-part of Ser. No. 431,444, May 1, 1995.

[51] Int. Cl.$^6$ ...................................................... B60B 25/04
[52] U.S. Cl. ........................ 152/379.5; 152/400; 152/520
[58] Field of Search .................................. 152/375, 379.3, 152/379.4, 379.5, 381.4, 388, 389, 391, 393, 394, 513, 514, DIG. 9, DIG. 16, 516, 517, 520, 158, 400, 409, 410

[56] References Cited

U.S. PATENT DOCUMENTS

| | | | |
|---|---|---|---|
| 974,549 | 11/1910 | Bryant et al. | 295/7 |
| 1,687,330 | 10/1928 | Fitch | 152/394 |
| 1,817,356 | 8/1931 | Fisher | 152/394 |
| 2,145,343 | 1/1939 | Dempsey | 295/7 |
| 2,709,471 | 5/1955 | Smith et al. | 152/393 |
| 2,996,096 | 8/1961 | Powers | 152/352 |
| 3,117,614 | 1/1964 | Amici | 152/363 |
| 4,164,358 | 8/1979 | Entrup | 301/36 |
| 4,218,097 | 8/1980 | Olinger et al. | 301/5.21 |
| 4,351,382 | 9/1982 | Corner et al. | 152/330 |
| 4,371,024 | 2/1983 | Stein et al. | 152/513 X |
| 4,373,567 | 2/1983 | Declercq | 152/405 |
| 4,393,913 | 7/1983 | Graway et al. | 152/364 |
| 4,422,490 | 12/1983 | Power | 152/394 |
| 4,434,864 | 3/1984 | Lupo | 180/6.2 |
| 4,461,333 | 7/1984 | Filliol et al. | 152/520 X |
| 4,561,482 | 12/1985 | Tavazza et al. | 152/381.4 |
| 4,658,876 | 4/1987 | Augier | 152/405 |
| 4,720,149 | 1/1988 | Thissen et al. | 301/5 |
| 4,878,527 | 11/1989 | Noma | 152/379.3 |
| 4,953,291 | 9/1990 | Markow | 152/520 X |
| 4,969,692 | 11/1990 | Yung | 301/5 |
| 5,022,718 | 6/1991 | Diekevers | 295/7 |
| 5,232,034 | 8/1993 | Gergele | 152/394 |

FOREIGN PATENT DOCUMENTS

| | | | |
|---|---|---|---|
| 2456419 | 8/1976 | Germany | 152/381.3 |
| 262206 | 10/1989 | Japan | 152/520 |
| 1643191 | 4/1991 | U.S.S.R. | 152/520 |

*Primary Examiner*—Russell D. Stormer
*Attorney, Agent, or Firm*—Bliss McGlynn, P.C.

[57] ABSTRACT

A composite wheel is used with a pneumatic tire having at least one bead. The composite wheel includes a circular drum having an elongated skirt extending out from the circular drum substantial perpendicular thereto along the periphery of the circular drum. A tire bead retention member receives the bead of the pneumatic tire and is then removably secured to the elongated skirt with a nut and bolt fastening system. The removability of the tire bead retention member enables the pneumatic tire to be dismountable from the composite wheel. Run flat devices are attachable to or formed with the tire bead retention members prior to mounting the drum body which allow the pneumatic tire to run without air without destroying sidewalls of the pneumatic tire.

5 Claims, 5 Drawing Sheets

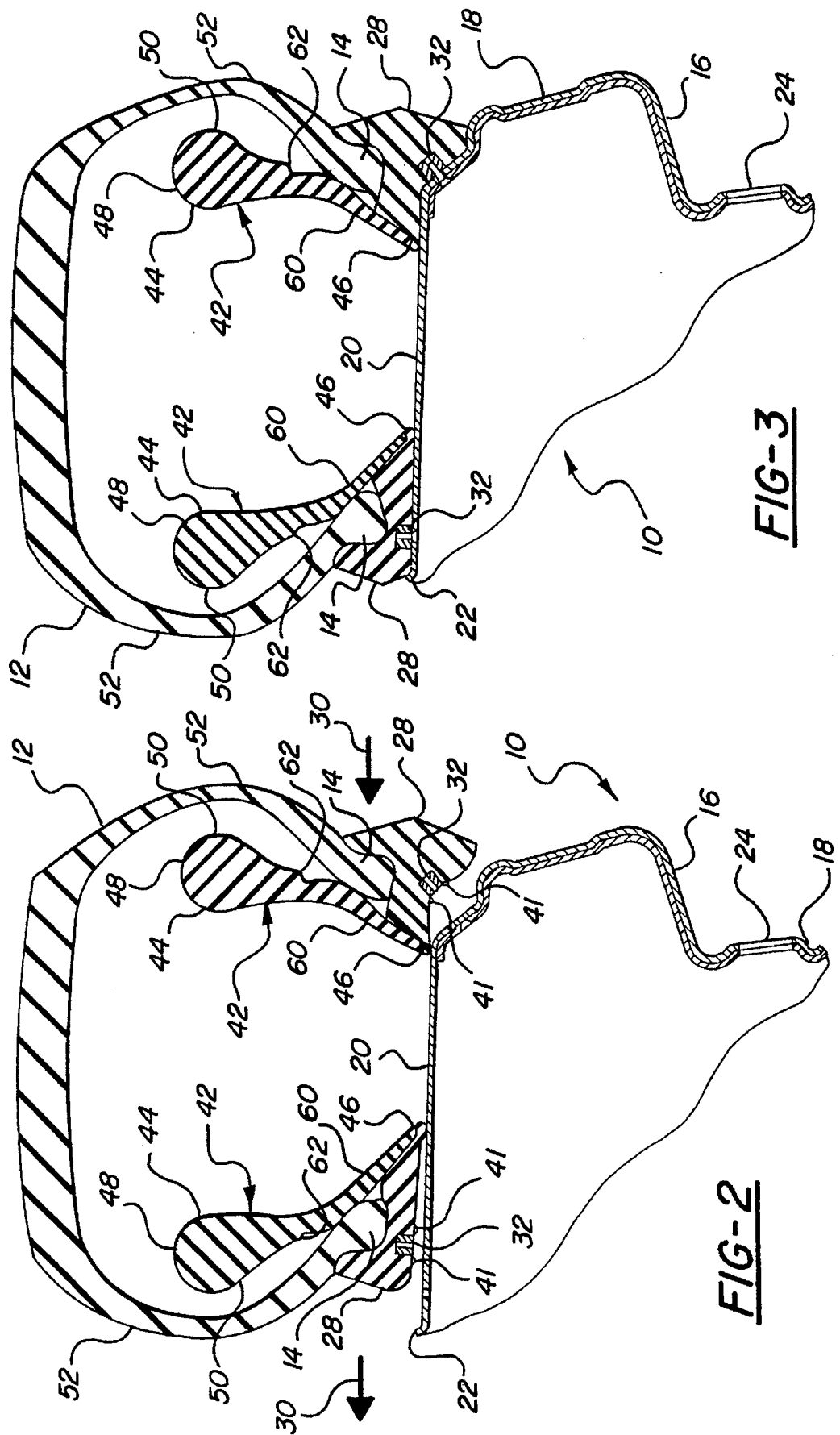

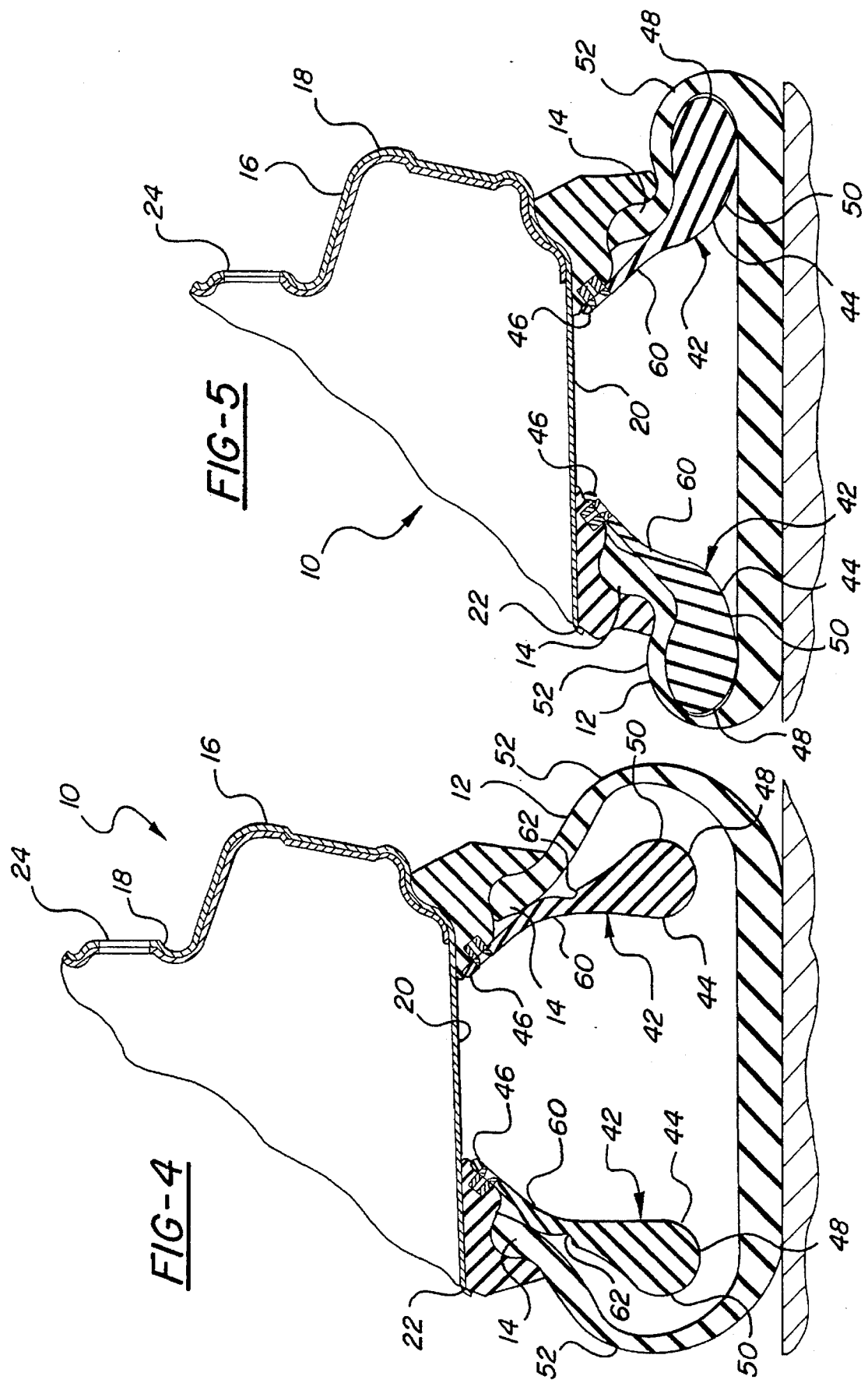

COMPOSITE WHEEL

The application is a continuation-in-part of Ser. No. 08/431,444 filed on May 1, 1995.

BACKGROUND OF THE INVENTION

1. Field of the Invention

The invention relates to wheel composites of the type having resiliently compressive components.

2. Description of the Related Art

Although the tire and suspension technologies of the automobile have made great strides in recent years, the steel wheel has not had a substantial improvement in close to a century. Performance of the wheel, generally accepted as being poor, has never been the subject of any successful research and development. Advancement in noise attenuation and brake size efficiency have consistently not produced practical answers employed in the steel wheel.

U.S. Pat. No. 5,232,034, issued to Gergele on Aug. 3, 1993, shows a heavy-duty wheel with adaptive tire bead retention members extending around the wheel. The tire bead retention members are used to eliminate the necessity of the multi-part wheel rims without losing brake clearance. The tire bead retention members extend over the existing incompressible flanges to allow the proper mating engagement with the tires having a different tire bead profile than that of the wheel. More specifically, the vulcanized rubber tire bead retention members are merely inserts used in conjunction with a wheel having incompressible rims so a single wheel may seat two different tire bead profiles. As is disclosed in U.S. Pat. No. 5,232,034, the inserts require the existence of the incompressible flanges to work properly. Additionally, the tire bead retention members do not eliminate the requirement of a well because the tire bead profile is designed to be forced over the incompressible tire bead retention members.

Compressible tire bead retention members reduce road noise and eliminate the need for the wheel well. The current designs are, however, deficient in that it is difficult to dismount the tire from the wheel.

SUMMARY OF THE INVENTION AND ADVANTAGES

A composite wheel for a pneumatic tire having at least one bead comprises a drum defining a longitudinal access. The drum includes a circular drum body extending perpendicularly to the longitudinal access and a elongated skirt extending out from the drum body generally parallel to the longitudinal access. The composite wheel further comprises a tire bead retention member which receives the bead of the pneumatic tire. The tire bead retention member provides a sole restraint of the bead against axle and radial separation from the composite wheel. The tire bead retention member is removably securable to the elongated skirt. The advantage associated with the invention include the ability to remove the pneumatic tire from the wheel after it has been mounted to the wheel. A further advantage includes the ability to use run flat devices of reduced weight wherein the run flat devices allow the pneumatic tire to be operated when the air is removed.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 2 is a cross-sectional view partially cut away of a pneumatic tire being mounted to a wheel using the preferred embodiment of the invention;

FIG. 3 is a cross-sectional view partially cut away showing a pneumatic tire mounted to another embodiment of the invention;

FIG. 4 is a cross-sectional view partially cut away of an inflated pneumatic tire mounted to the preferred embodiment of the invention;

FIG. 5 is a cross-sectional partially cut away of a deflated pneumatic tire mounted to the preferred embodiment of the subject invention;

DETAILED DESCRIPTION OF THE DRAWINGS

Figure 1:
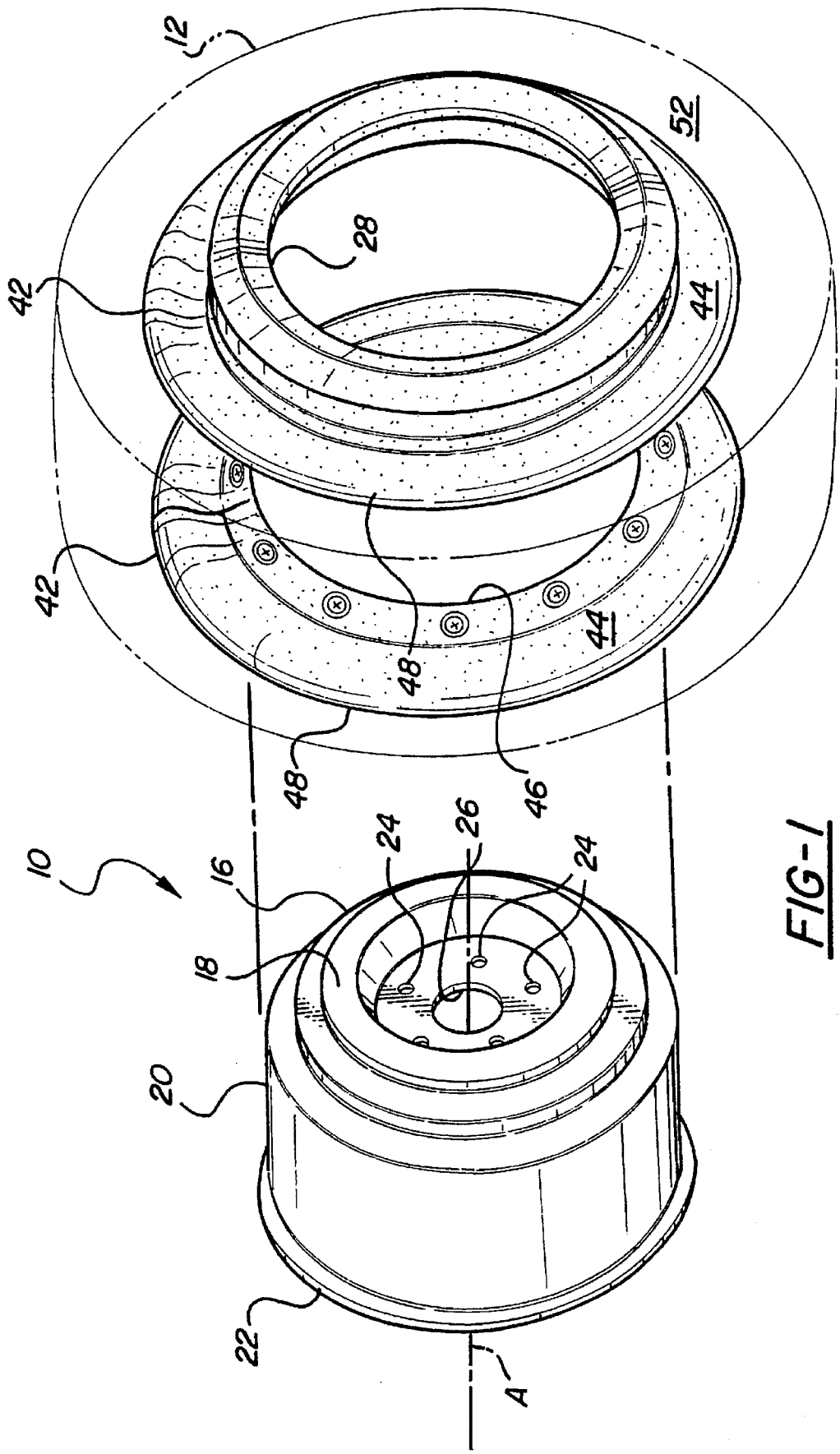
FIG. 1 is an exploded perspective view of the preferred embodiment of the invention with the pneumatic tire shown in phantom.

With reference to the Figures, the invention is generally indicated at 10. The invention is a composite wheel 10 used for pneumatic tires 12 having at least one bead 14. Pneumatic tires 12 generally have two beads 14. The tire bead 14 is a reinforced portion of the pneumatic tire 12 which is used to secure the pneumatic tire 12 to the wheel, in this case, a composite wheel 10. The pneumatic tire 12 is the standard vehicular tire used by the majority of the automotive industry today.

The composite wheel 10 includes a drum 16 defining a longitudinal access A. The drum 16 includes a circular drum body 18 which extends generally perpendicularly to the longitudinal access A. The drum 16 further includes an elongated skirt 20 which extends out from the drum body 18 at a small degree, approximately three degrees to the longitudinal access A. The elongated skirt is substantially cylindrical in shape which includes a positioning flange 22 at the distal end of the elongated skirt 20. The positional flange 22 aides in the positioning of the pneumatic tire 12 when it is finally mounted.

Although not necessary, the preferred embodiment of the elongated skirt 20 is fabricated from a sheet of steel separately from the drum body 18. The elongated skirt 20 is welded to the drum body 18 such that portions of the elongated skirt 20 and the drum body 18 overlap. The overlapping of these parts provides added strength to the welds while minimizing the thickness of the sheet metal used to fabricate each of the drum body 18 and elongated skirt 20. The sheet metal used to fabricate these parts is approximately two millimeters thick. It will be appreciated by those skilled in the art that the two millimeter thickness may vary drastically without changing the scope of the invention.

As may be seen from the Figures, the drum body 18 is contoured for both aesthetic and structural reasons. Lug nut holes 24 are used to receive lug nuts therethrough to secure the composite wheel 10 to the hub of a vehicle (neither shown). A portion of the hub may extend through a central hole 26, best seen in FIGS. 1 and 8.

A tire bead retention member, generally shown at 28, receives the bead 14 of the pneumatic tire 12 thereon. The tire bead retention member 28 provides the sole restraint of the bead 14 against axial and radial separation from the composite wheel 10. The tire bead retention member 10 is resiliently compressible. The tire bead retention member 28 is fabricated from a rubber, typically vulcanized, having a hardness greater than 65 Shore.

The tire bead retention members 28 are removably securable to the elongated skirt 20. The retention members 28 are positioned adjacent the beads 14 of the pneumatic tire 12 prior to mounting the retention members 28 on the drum 16. The retention members 28 and the pneumatic tire 12 are slid across the elongated skirt 20 in the direction of arrows 30, shown in FIG. 2.

The tire bead retention members 28 include a plurality of incompressible inserts 32 bonded therein. Each of the inserts 32 include a mating surface 34. In the preferred embodiment, the mating surface 34 is a threaded surface. The elongated skirt 20 includes a plurality of fasteners, screws 36, each of the plurality of fasteners 36 complementing each of the mating surfaces 34. Therefore, the elongated skirt 20 includes a screw 36 or similar fastener which engages the mating surface 34 to secure the tire bead retention members 28 to the drum 16.

Although the invention 10 may utilize a single tire bead retention member 28, the preferred embodiment of the invention 10 includes a second tire bead retention member 28 which provides the sole restraint of the second bead 14 against axial and radial separation from the composite wheel 10. The second tire bead retention member 28 is also removably securable to the elongated skirt 20. Utilizing a second tire bead retention member 28 similar to the first 28 insures the maximum balancing and mass distribution to reduce harmonics created by the composite wheel 10 to a minimum.

Figure 8:
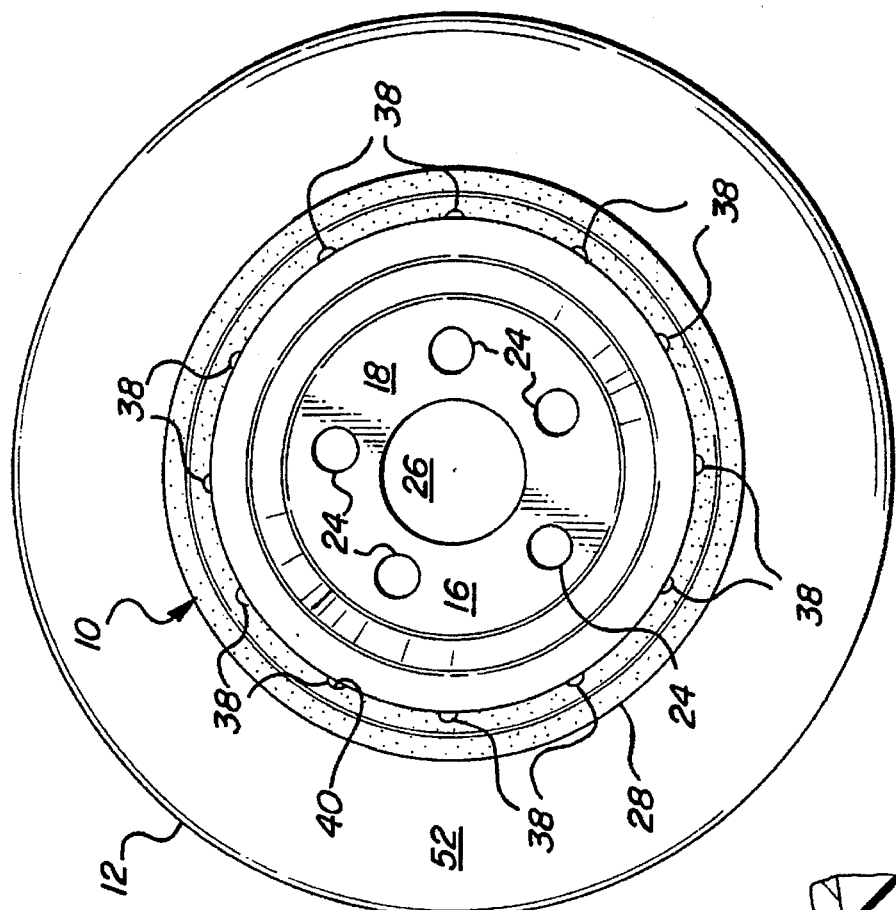
FIG. 8 is a side view of the preferred embodiment of the invention.
Figure 6:
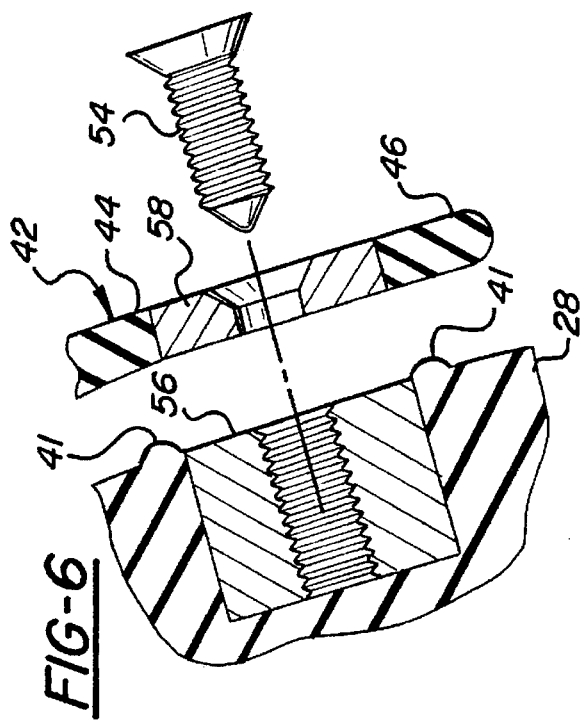
FIG. 6 is a cross-sectional view partially cut away of a mounting device for the run flat device.
Figure 7:
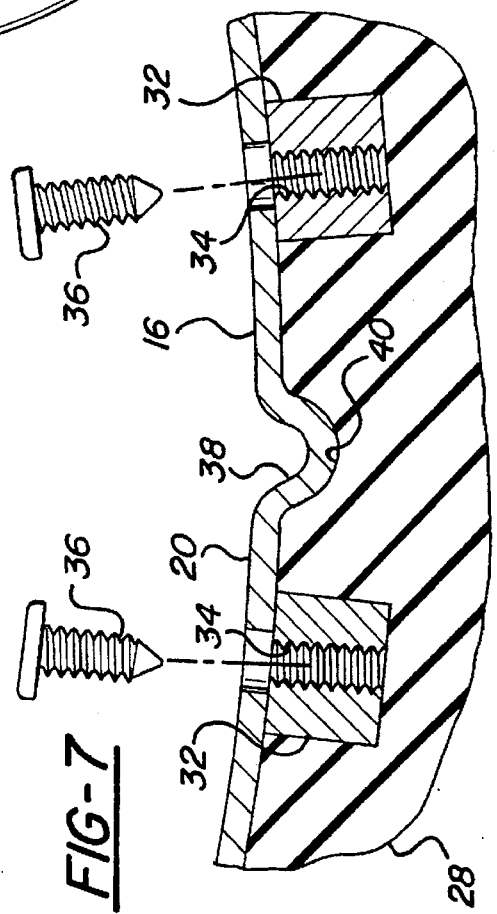
FIG. 7 is a cross-sectional view partially cut away of the mounting device for the tire bead retention members.

Turning attention to FIGS. 7 and 8, the elongated skirt 20 is shown to include a plurality of positioning members 38. The positioning members 38 are bumps in the elongated skirt 20. Each of the tire bead retention members 28 included a plurality of complementing positioning members 40 which are grooves having a surface area matching that of the positioning members 38 of the elongated skirt 20. The combination of positioning members 38 and the complementing positioning members 40 insure the tire bead retention members 28 are correctly positioned. If the tire bead retention members are not properly aligned, the positioning members 38 and complementing positioning members 40 will prevent the inflation of the pneumatic tire 12. Therefore, until the retention members 28 are properly positioned on the drum 16, the tire 12 and composite wheel 10 combination will be useless because the tire 12 will not be inflatable. This measure ensures proper operation of the vehicle using the composite wheel 10. A deflator 41 surrounds or is at least adjacent one side of each of the incompressible inserts 32. If the tire bead retention members 28 are not properly aligned, the deflators 41 will deflate the pneumatic tire 12. If they are properly aligned, the deflators 41 will be crushed allowing the pneumatic tire 12 to inflate.

Run flat devices 42 are used in conjunction with a wheel 10 having a drum body 16, an elongated skirt 20, a tire bead retainer 28 and a pneumatic tire 12. The run flat devices 42 include a resiliently deformable body 44 extending between an interior edge 46 and external edge 48. The interior edge 46 defines an inner diameter whereas the external edge 48 defines an outer diameter.

A side wall separator 50 is disposed adjacent the external edge 48. The side wall separator 50 prevent the side walls 52 of the pneumatic tire 12 from folding onto themselves. More specifically, the side wall separators 50 provide structural support to space the upper and lower portions of the side walls 52 such that the side walls 52 do not fold onto themselves thereby minimizing the potential for the destruction of the side walls 52.

A plurality of run flat fasteners 54 secure the interior edge 46 of the run flat devices 42 to the tire bead retainer 28. The plurality of fasteners 54 include a screw with a mating surface insert 56 in the tire bead retainer 28. A metal insert 58 is secured to the interior edge 46 or adjacent thereto. All of the inserts 32,56,58 are bonded to the rubber which fabricates both the retention numbers 28 and the run flat devices 42. The inserts are in differing cross-sectional planes than the run flat inserts 56, 58 to maximize the strength of the present invention.

A flexible spacer 60 provides space for the side wall separator 50 from the interior edge 46. More specifically, the flexible spacer 60 extends between the interior edge 46 and the side wall separator 50. A slit 62 extends through the flexible spacer to increase the flexibility thereof. Due to the hardness of the rubber which is used to fabricate the run flat fasteners 54, the slit 62 increased the flexibility thereof to ensure the side wall separators 50 are properly positioned inside the fold of the side walls 52 when the pneumatic tire 12 loses air pressure required to operate or run in a flat condition, as best seen in FIG. 5. Turning attention to FIG. 4, the run flat devices 42 are separated from the side walls 52 during normal operation of the pneumatic tire 12 and wheel 10. The hardness of the rubber used to fabricate the run flat devices 42 is greater than 65 Shore.

Referring to FIG. 3, wherein like primed numerals represent like structures, an alternative embodiment of the invention is a tire bead retention member which includes a run flat device formed thereto at an interior end of the tire bead retention member. More specifically, the run flat device and the tire bead retention member are formed as a unitary piece. Therefore, the bead is inserted between a flange of the tire bead retention member and the run flat device prior to sliding the tire bead retention member onto the elongated skirt of the drum.

Figure 9:
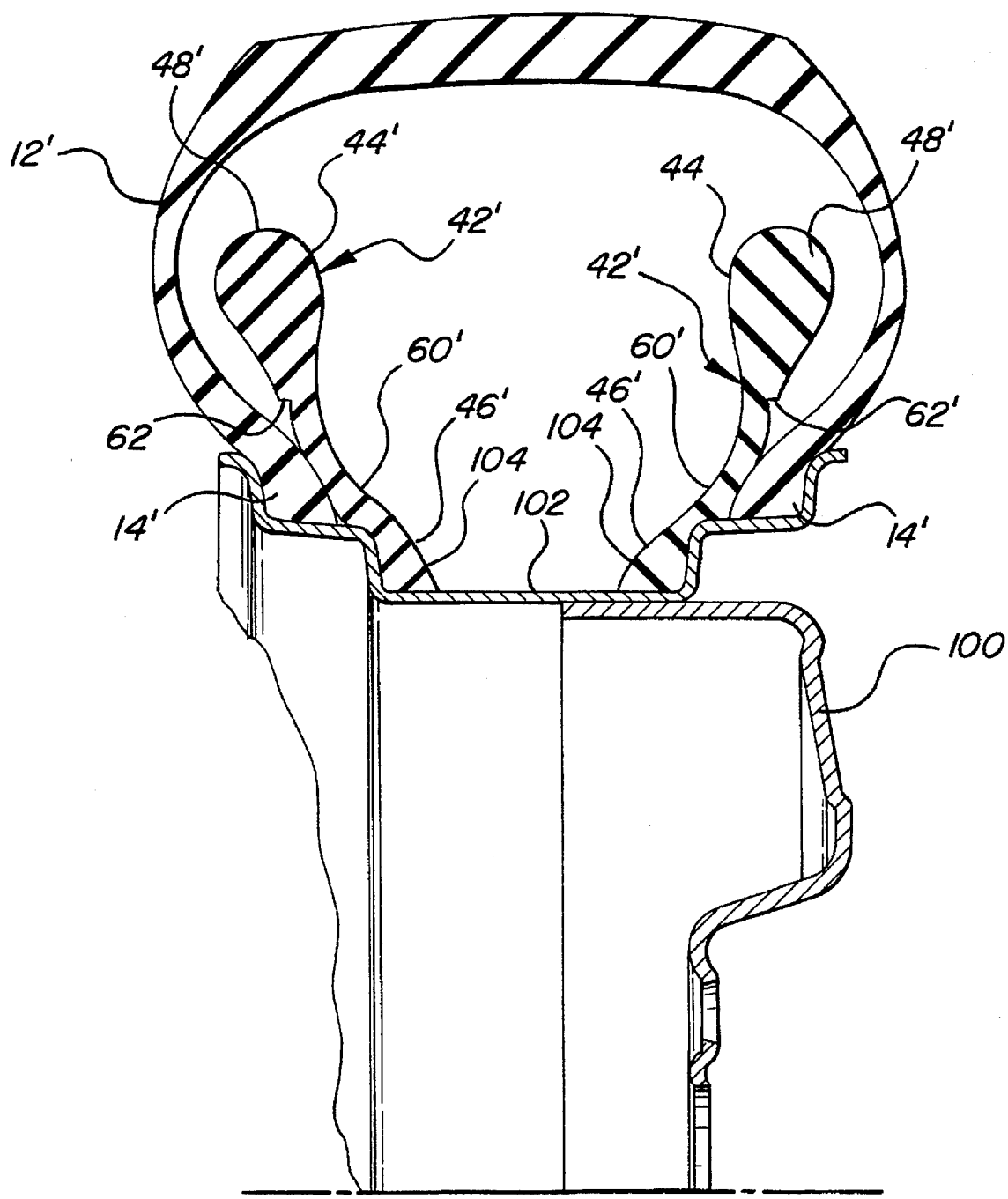
FIG. 9 is cross-sectional view partially cut away of an alternative embodiment of the invention.

Referring to FIG. 9, wherein like primed numerals represent similar elements, yet another alternative embodiment of the present invention is shown. This embodiment includes the run flat devices 42' which designed to be incorporated with a standard wheel 100 having a well 102. The run flat device 42' includes an enlarged well receiving end 104 which partially seats in the wheel well 102. The run flat device 42' may be secured to either the pneumatic tire 12', the wheel 100, or both.

In operation, the method for mounting the pneumatic tire having two tire beads 14 to a wheel 10 using two tire bead retainers 28 include the steps of: removably securing the two tire beads 14 into each of the two tire bead retainers 28; sliding the two tire bead retainers 28 over the elongated skirt 20 of the composite wheel 10; and securing the two tire bead retainers 28 to the wheel 10. The two tire bead retainers 28 are aligned on the elongated skirt 20 prior to securing the tire bead retainers 28 to the elongated skirt 20. Prior to sliding the retainer numbers 28 over the elongated skirt 20, the run flat devices 42, if used, are secured to the tire bead retainers 28 inside the tire 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A composite wheel for a pneumatic tire having at least one bead and a side wall extending out therefrom comprising:

a drum defining a longitudinal axis, said drum including a circular drum body extending perpendicularly to said longitudinal access and an elongated skirt extending out from said drum body defining a circular cross section; and a tire bead retention member receiving the bead of the pneumatic tire such that said tire bead retention member positions the bead of the pneumatic tire outside said circular cross-section and provides the sole restraint of the bead against axial and radial separation from said composite wheel, said tire bead retention member being removably securable to said elongated skirt, said tire bead retention member including a run flat device extending out therefrom to an external edge defining an outer diameter and having a side wall separator disposed adjacent said external edge whereby said side wall separator preventing the side wall of the pneumatic tire from folding onto itself.

2. A composite wheel as set forth in claim 1 further characterized by a flexible spacer spacing said side wall separator from said tire bead retention member.

3. A composite wheel as set forth in claim 2 further characterized by said flexible spacer including a slit to increase flexibility thereof.

4. A composite wheel as set forth in claim 3 further characterized by said tire bead retention member and run flat device being fabricated from rubber.

5. A composite wheel as set forth in claim 4 further characterized by said rubber having a hardness greater than 65 Shore.

* * * * *

UNITED STATES PATENT AND TRADEMARK OFFICE
CERTIFICATE OF CORRECTION

PATENT NO. : 5,634,506
DATED : June 3, 1997
INVENTOR(S) : Pierre Augier

It is certified that error appears in the above-indentified patent and that said Letters Patent is hereby corrected as shown below:

Column 1, line 45, "access" should be -- axis --.

Column 1, line 47, "access" should be -- axis --.

Column 1, line 49, "access" should be -- axis --.

Column 2, line 37, "access" should be -- axis --.

Column 2, line 39, "access" should be -- axis --.

Column 2, line 42, "access" should be -- axis --.

Column 3, line 6, delete "Shore." and insert therefor -- Shore A."

UNITED STATES PATENT AND TRADEMARK OFFICE
CERTIFICATE OF CORRECTION

PATENT NO. : 5,634,506
DATED : June 3, 1997
INVENTOR(S) : Pierre Augier

It is certified that error appears in the above-indentified patent and that said Letters Patent is hereby corrected as shown below:

Column 3, line 59, after "drum" delete -- body --.

Column 3, line 67, "separator" should be -- separators --.

Column 4, line 13, "retention numbers" should be -- tire bead retention members --.

Column 4, line 61, "retainer numbers" should be -- retention members --.

Signed and Sealed this

Sixteenth Day of June, 1998

Attest:

BRUCE LEHMAN

Attesting Officer

Commissioner of Patents and Trademarks